(12) United States Patent
Oguro (10) Patent No.: US 12,370,906 B2
(45) Date of Patent: Jul. 29, 2025

(54) ELECTRIC VEHICLE

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 223 days.

(21) Appl. No.: 17/882,714

(22) Filed: Aug. 8, 2022

(65) Prior Publication Data

US 2023/0057597 A1 Feb. 23, 2023

(30) Foreign Application Priority Data

Aug. 20, 2021 (JP) ................................ 2021-134502

(51) Int. Cl.
*B60L 15/20* (2006.01)

(52) U.S. Cl.
CPC ....... *B60L 15/2036* (2013.01); *B60L 2240/20* (2013.01); *B60L 2240/24* (2013.01); *B60L 2240/423* (2013.01)

(58) Field of Classification Search
CPC ............. B60L 15/2036; B60L 2240/20; B60L 2240/24; B60L 2240/423; B60L 2220/42; B60L 2220/46; B60L 2240/461; B60L 2240/465; Y02T 10/72
See application file for complete search history.

(56) References Cited

U.S. PATENT DOCUMENTS

| 7,739,005 | B1 * | 6/2010 | Tang .......................... | B60L 3/10 |
| | | | | 701/69 |
| 2019/0039416 | A1 * | 2/2019 | Miyazaki ........... | B29D 30/0606 |
| 2019/0040949 | A1 * | 2/2019 | Amano ................. | B60W 20/15 |
| 2020/0331461 | A1 * | 10/2020 | Imamura ......... | B60W 30/18172 |
| 2020/0339121 | A1 * | 10/2020 | Jang ....................... | B60W 10/20 |
| 2020/0376958 | A1 * | 12/2020 | Ono ....................... | B60K 17/22 |
| 2021/0197778 | A1 * | 7/2021 | Shi ......................... | B60T 8/1761 |
| 2021/0276573 | A1 * | 9/2021 | Ota ........................... | B60T 7/12 |
| 2023/0057597 | A1 * | 2/2023 | Oguro ................. | B60L 15/2036 |

OTHER PUBLICATIONS

Tesla Life, Youtube video clip entitled, "Tesla's Slip Start Explained," uploaded on Nov. 16, 2018 by user Tesla Life, https://www.youtube.com/watch?v=C1DqDOES3el (Year: 2018).*
"Model 3 Owner's Manual Software version: 2022.12 North America", p. 62 (English translation of prior cited "Model 3 Owner's Manual Software Version: Dec. 25, 2021 Japan", [online], TESLA, Inc., posted on Jul. 9, 2021, p. 61).
"Model 3 Owner's Manual Software Version: Dec. 25, 2021 Japan", [online], TESLA, Inc., posted on Jul. 9, 2021, p. 61 (in Japanese).

\* cited by examiner

*Primary Examiner* — Daniel M. Robert
(74) *Attorney, Agent, or Firm* — TROUTMAN PEPPER LOCKE LLP (57) ABSTRACT

An electric vehicle includes a yaw rate sensor and a processor. The yaw rate sensor is configured to measure a yaw rate of a vehicle body in a vehicle. The processor is configured to control respective torques of right and left rear wheels coupled to respective motors of the electric vehicle. In a case where a mode that allows the right and the left rear wheels to slip is selected as a traveling mode of the vehicle, the processor is configured to perform a control to suppress one of the torques of the right and the left rear wheels on a basis of the yaw rate measured by the yaw rate sensor.

2 Claims, 8 Drawing Sheets

ELECTRIC VEHICLE

CROSS-REFERENCE TO RELATED APPLICATION

The present application claims priority from Japanese Patent Application No. 2021-134502 filed on Aug. 20, 2021, the entire contents of which are hereby incorporated by reference.

FIELD OF THE INVENTION

The technology relates to an electric vehicle.

BACKGROUND

In recent years, an electric vehicle has been developed in order to escape from snow or the like when traveling in a condition such as deep snow. Such an electric vehicle has a function that enables a driver to select intentional rotation of wheels at a high speed to cause the wheels to slip and to clear snow. For example, reference is made to "MODEL 3 Owner's Manual Software Version: 2021.12.25 Japan", [online], TESLA, Inc., posted on Jul. 9, 2021, p. 61.

Note that, although the electric vehicle in the disclosure refers to an automobile that enables a motor to drive wheels, the electric vehicle may include a prime mover such as an engine in addition to the motor.

SUMMARY

An aspect of the technology provides an electric vehicle. The electric vehicle includes a yaw rate sensor and a processor. The yaw rate sensor is configured to measure a yaw rate of a vehicle body in a vehicle. The processor is configured to control respective torques of right and left rear wheels coupled to respective motors of the electric vehicle. In a case where a mode that allows the right and the left rear wheels to slip is selected as a traveling mode of the vehicle, the processor is configured to perform a control to suppress one of the torques of the right and the left rear wheels on a basis of the yaw rate measured by the yaw rate sensor.

BRIEF DESCRIPTION OF THE DRAWINGS

The accompanying drawings are included to provide a further understanding of the technology, and are incorporated in and constitute a part of this specification. The drawings illustrate example embodiments and, together with the specification, serve to explain the principles of the technology.

DETAILED DESCRIPTION

For example, it is often the case, on a road surface in deep snow, that there is a compacted snow road, a frozen road surface, or the like (hereinafter, referred to as a low-μ road, i.e., a road surface having a low friction coefficient μ) subsequent to the road surface in deep snow.

Figure 11:
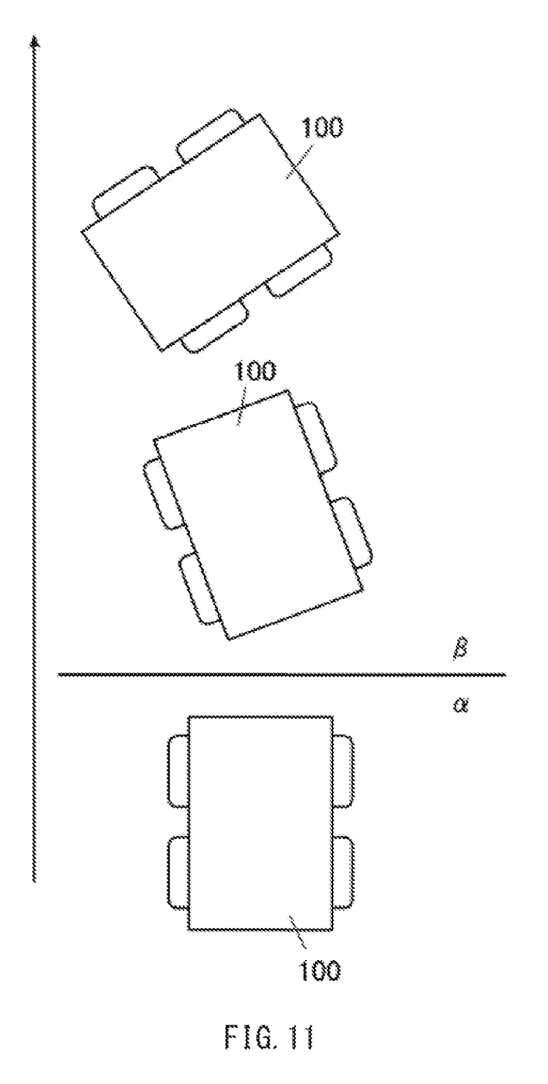
FIG. 11 is a conceptual diagram exemplifying a state in which the rear wheel side of the vehicle body swings from side to side.

For example, as illustrated in FIG. 11, when a vehicle body 100 having escaped from deep snow α by rotating wheels at a high speed enters a low-μ road β, a skid can occur, possibly causing a rear wheel side of the vehicle body 100 to swing from side to side (rightward in the case of FIG. 11) in some cases.

When a driver of a vehicle steers to correct an attitude of the vehicle body 100 (when steering to the right in the case of FIG. 11), then the rear wheel side of the vehicle body 100 swings greatly in the opposite direction (leftward in the case of FIG. 11).

Even when successfully escaping from a condition such as the deep snow using a snow clearing function as described above, a subsequent vehicle behavior can be greatly disturbed in some cases.

It is desirable to provide an electric vehicle that makes it possible to suppress a disturbance in a vehicle behavior when entering a low-μ road in a state where a wheel is slipped.

In the following, some example embodiments of the electric vehicle of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

The description is given below of a case where the electric vehicle is a narrow-sense electric vehicle including a battery as a power source without any other prime mover such as an engine. However, the electric vehicle may also include a prime mover other than the motor. In addition, the description is given below of a case where a motor is provided for each of wheels, but the motor may be provided only for right and left rear wheels.

Figure 1:
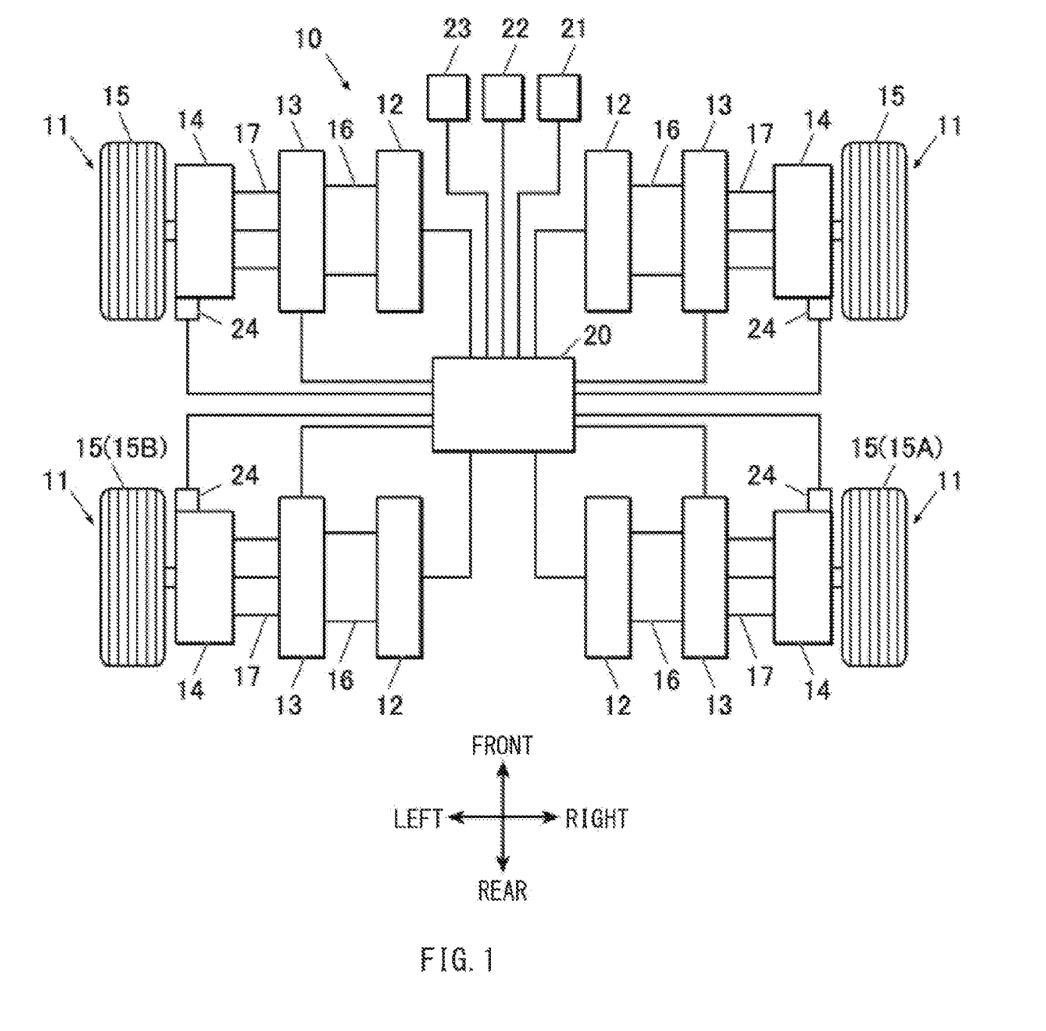
FIG. 1 is a diagram illustrating an example of a configuration of an electric vehicle according to one example embodiment of the technology.

FIG. 1 is a diagram illustrating an example of a configuration of an electric vehicle according to an example embodiment of the technology. In the example embodiment of the technology, an electric vehicle 10 may include, for example, a battery 12, an inverter 13, a motor 14, a wheel 15, and a processor 20. Hereinafter, a right rear wheel is referred to as a rear wheel 15A, and a left rear wheel is referred to as a rear wheel 15B.

In the example embodiment of the technology, the battery 12 may supply direct-current power of a predetermined power value to the inverter 13 via a power line 16 under a control of the processor 20. In one embodiment, the electric vehicle 10 may serve as an "electric vehicle". In one embodiment, the motor 14 may serve as a "motor". In one embodiment, the wheel 15 may serve as a "wheel". In one embodiment, the processor 20 may serve as a "processor". In one embodiment, the rear wheel 15A and the rear wheel 15B may serve as "right and left rear wheels".

The inverter 13 may convert the direct-current power supplied from the battery 12 into alternating-current power under the control of the processor 20. The inverter 13 and the motor 14 may be coupled to each other by a wiring line 17 such as a three-phase line, and the inverter 13 may supply the alternating-current power to the motor 14 via the wiring line 17.

The motor 14 may be coupled to the wheel 15 via an unillustrated gear. In the example embodiment of the technology, the inverter 13 and the motor 14 may be coupled to each other by the wiring line 17, and the motor 14 may be directly coupled to the wheel 15 in this manner, thus constituting one drive system 11. The motor 14 may be directly coupled to the wheel 15. Here, the term "directly coupled" may mean that the motor 14 is coupled to the wheel 15 without a clutch mechanism.

In the example embodiment of the technology, as illustrated in FIG. 1, one battery 12 (power source) may be provided for each of four drive systems 11 on front and rear sides and right and left sides, and the battery 12 and the inverter 13 may be coupled to each other by the power line 16 for each of the drive systems 11. However, it is also possible to configure the battery 12 (power source) to supply power to a plurality of inverters 13.

In addition, although FIG. 1 illustrates a case where the battery 12 and the inverter 13 are coupled to each other by two power lines 16 and the inverter 13 and the motor 14 are coupled to each other by three wiring lines 17, the number of each of the power line 16 and the wiring line 17 is not limited thereto.

The processor 20 may include one electronic control unit (ECU) or a plurality of ECUs operating in conjunction with one another.

In the processor 20, a central processing unit (CPU) of the ECU may execute a control program to control the battery 12, thereby controlling the power value of the direct-current power to be supplied to the inverter 13.

The processor 20 may transmit, for example, a pulse-width modulation (PWM) signal to the inverter 13, for example, to control the inverter 13, thereby controlling a torque to be generated by the motor 14.

In the example embodiment of the technology, the processor 20 thus controls a torque T of corresponding one of the wheels 15 including the right and the left rear wheels 15A and 15B. In one embodiment, the torque T may serve as a "torque".

The processor 20 may be coupled to a steering angle sensor 21 that measures a steering angle θ of an unillustrated steering wheel and to a yaw rate sensor 22 that measures a yaw rate γ of a vehicle body. The processor 20 may be coupled to each wheel speed sensor 24 that measures a wheel speed v of corresponding one of the wheels 15. In one embodiment, the steering angle sensor 21 may serve as a "steering angle sensor". In one embodiment, the steering angle θ may serve as a "steering angle". In one embodiment, the yaw rate sensor 22 may serve as a "yaw rate sensor". In one embodiment, the yaw rate γ may serve as a "yaw rate" or a "first yaw rate". In one embodiment, the wheel speed sensor 24 may serve as a "wheel speed sensor". In one embodiment, the wheel speed v may serve as a "wheel speed".

The processor 20 may be coupled to necessary sensors including, for example, an accelerator position sensor, a brake sensor, and an acceleration sensor.

The processor 20 may be coupled to a global positioning system (GPS) receiver 23 that receives, from unillustrated GPS satellites, a GPS signal including data on a position of the vehicle body. In one embodiment, the GPS receiver 23 may serve as a "receiver". The GPS receiver 23 may be a global navigation satellite system (GNSS) receiver that supports one or more GNSS types other than the GPS.

The processor 20 may control the battery 12 and the inverter 13 in response to the signal or the data inputted from the steering angle sensor 21, the yaw rate sensor 22, the GPS receiver 23, or the like, thereby controlling each of the drive systems 11 each including the motor 14.

In addition, the processor 20 may calculate a vehicle body speed V on the basis of the data on the position of the vehicle body received by the GPS receiver 23. For example, the processor 20 may calculate an amount of movement of the vehicle body by calculating a difference between pieces of data on the position of the vehicle body every time the GPS receiver 23 receives the data on the position from the GPS satellites. Then, the processor 20 may divide the calculated amount of movement of the vehicle body by a sampling cycle of the GPS receiver 23, thereby making it possible to calculate the vehicle body speed V. In one embodiment, the vehicle body speed V may serve as a "vehicle body speed".

The positional data in the GPS signal may contain a relatively large error in some cases. However, calculating the difference between the pieces of positional data as described above offsets the error in the positional data, thereby making it possible to eliminate, from the calculated vehicle body speed V, an influence of the error in the positional data.

In the example embodiment of the technology, the electric vehicle 10 may have, as vehicle traveling modes, a first traveling mode and a second traveling mode, for example. The first traveling mode is a normal traveling mode. The second traveling mode allows the right and the left rear wheels 15A and 15B to slip in order to escape from a condition such as deep snow.

It is possible for a driver of the electric vehicle 10 to appropriately select a traveling mode from among the traveling modes.

Figure 2:
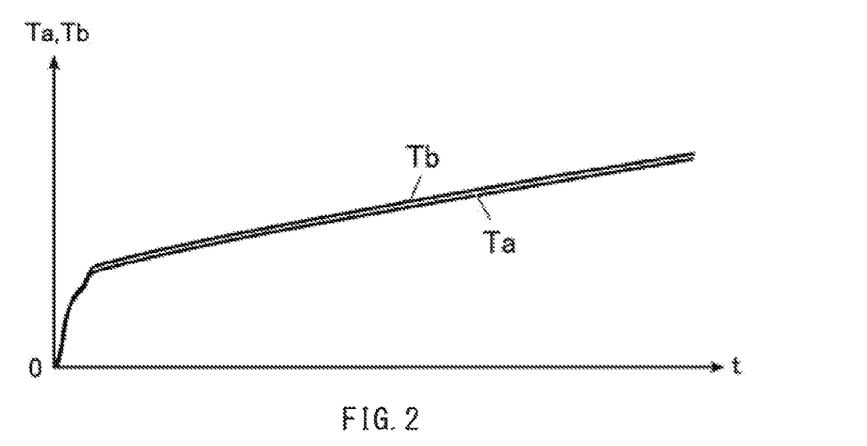
FIG. 2 is a diagram illustrating an example of a way of controlling torques of right and left rear wheels.

When the second traveling mode is selected as the traveling mode of the vehicle, the processor 20 controls respective torques Ta and Tb of the right and the left rear wheels 15A and 15B to be changed, as exemplified in FIG. 2, for example, in response to a pressing amount of an accelerator pedal pressed by the driver. In one embodiment, the torques Ta and Tb may serve as the "torque".

Figure 3:
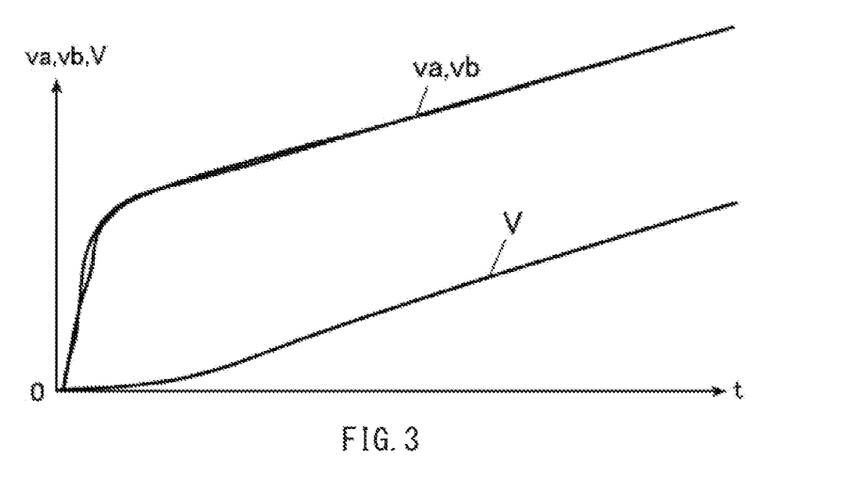
FIG. 3 is a diagram illustrating an example of temporal changes in each wheel speed of the right and the left rear wheels and a speed of a vehicle body.

Accordingly, as exemplified in FIG. 3, respective wheel speeds va and vb of the right and the left rear wheels 15A and 15B measured by respective wheel speed sensors 24 may be each in a state of being greater than the vehicle body speed V. The vehicle body speed V may be calculated from the data on the position of the vehicle body received by the GPS receiver 23 as described above. That is, the right and the left rear wheels 15A and 15B may be in a state of being slipped. In one embodiment, the wheel speeds va and vb may serve as the "wheel speed".

In the example embodiment of the technology, in a case where the second traveling mode is selected by the driver in this manner, the processor 20 may intentionally rotate the right and the left rear wheels 15A and 15B at a high speed to cause the wheels 15A and 15B to slip and to clear snow or the like, thereby attempting to escape from the condition such as deep snow.

However, simply configuring the wheels 15A and 15B in this manner can possibly lead to great disturbance in a vehicle behavior. The disturbance can result from swinging of the rear wheel side of the vehicle from side to side as exemplified in FIG. 11, for example, when entering a low-μ road subsequent to a road surface in deep snow after having escaped from the deep snow, as described above.

Accordingly, in the example embodiment of the technology, configuring the control in the processor 20 as described below allows for suppression of the disturbance in the vehicle behavior when entering the low-μ road in a state where the wheel 15 (in particular, the rear wheels 15A and 15B) is slipped.

Description is given below of, for example, a configuration of the control for suppression of the disturbance in the vehicle behavior in the processor 20 of the electric vehicle 10 according to the example embodiment of the technology. In addition, description is given together as well of workings of the electric vehicle 10 according to the example embodiment of the technology.

As described above, when the second traveling mode is selected as the traveling mode of the vehicle, i.e., when the mode is selected that allows the right and the left rear wheels 15A and 15B to slip, the rear wheel side of the vehicle body can possibly swing from side to side in some cases when the vehicle enters the low-μ road after having escaped from the condition such as deep snow.

This phenomenon can occur in some cases due to steering of a steering wheel performed by the driver. In addition, the phenomenon can also occur in some cases due to a difference in friction coefficients μ of the right and the left rear wheels 15A and 15B even when the driver does not operate the steering wheel.

Figure 4:
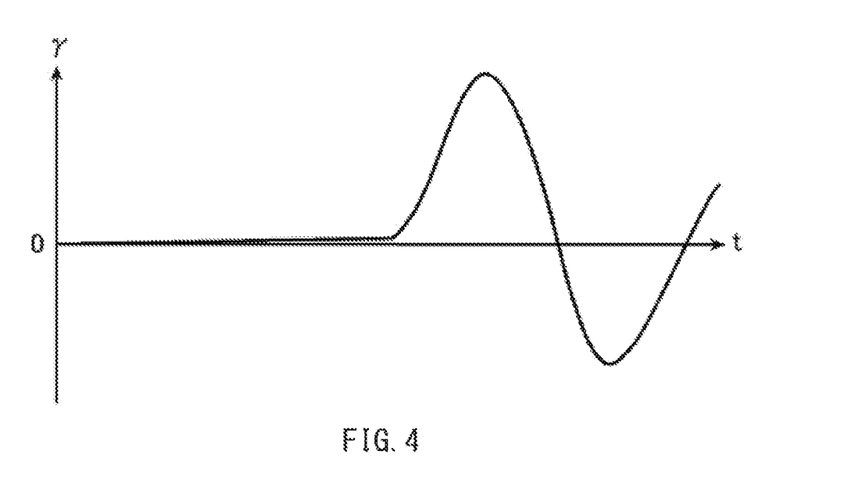
FIG. 4 is a diagram illustrating an example of a temporal change in a yaw rate of the vehicle body.

In a case where the rear wheel side of the vehicle body swings from side to side, the yaw rate γ of the vehicle body changes temporally in a positive direction or in a negative direction, as exemplified in FIG. 4. Using data on the yaw rate γ of the vehicle body helps to determine whether the rear wheels 15A and 15B swing rightward or leftward.

Accordingly, in the example embodiment of the technology, in a case where the second traveling mode is selected as the traveling mode of the vehicle, the processor 20 may perform a control to suppress the swinging of the rear wheel side of the vehicle body from side to side on the basis of the yaw rate γ of the vehicle body measured by the yaw rate sensor 22.

Figure 5:
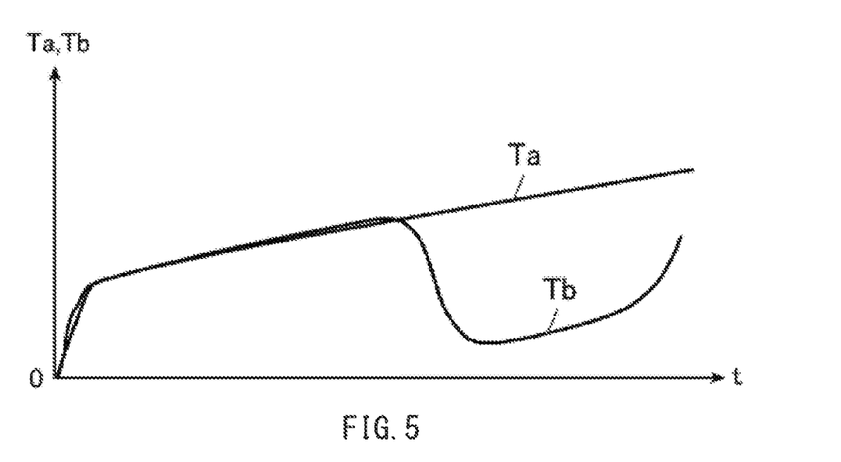
FIG. 5 is a diagram illustrating an example of a way of controlling the torques of the right and the left rear wheels, in which the torque of the left rear wheel is suppressed.

In this case, the processor 20 performs, on the basis of the yaw rate γ, a control to suppress any of the respective torques Ta and Tb of the right and the left rear wheels 15A and 15B as exemplified in FIG. 5.

In the example of FIG. 5, the torque Tb of the left rear wheel 15B is suppressed. This means a control in a case where the rear wheel side of the vehicle body having escaped from the deep snow α and having entered the low-μ road β first swings rightward as exemplified in FIG. 11.

Figure 6:
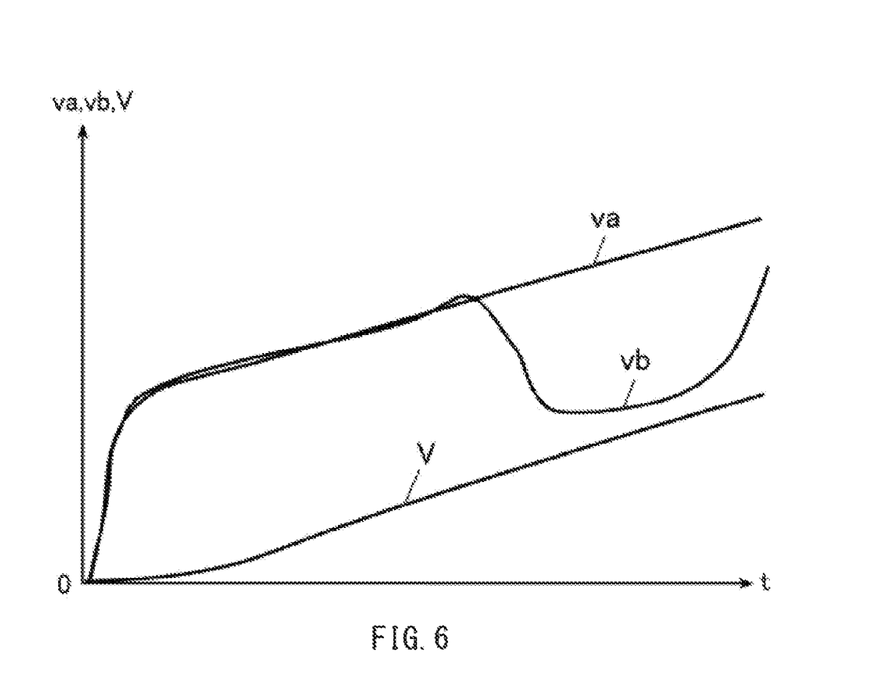
FIG. 6 is a diagram illustrating an example of temporal changes in each wheel speed of the right and the left rear wheels and a speed of the vehicle body in a case where the torques of the right and the left rear wheels are controlled as illustrated in FIG. 5.

Referring to the example of FIG. 5 for detailed description, as described above, upon rightward swinging of the rear wheel side of the vehicle body, the torque Tb of the left rear wheel 15B of the vehicle body may be suppressed. This may cause the wheel speed vb of the left rear wheel 15B to decrease and approach the vehicle body speed V, as illustrated in FIG. 6.

Accordingly, a degree of slipping of the left rear wheel 15B may be lowered, thus causing a gripping force (in particular, lateral grip described later) to be recovered and increased. Consequently, the rightward swinging of the rear wheel side of the vehicle body may be suppressed.

Accordingly, as described above, performing such a control may suppress the rightward swinging of the rear wheel side of the vehicle body, for example, in a case where the rear wheel side of the vehicle body having escaped from the deep snow α and having entered the low-μ road β swings rightward. Such suppression of the rightward swinging of the rear wheel side of the vehicle body may be achieved by the suppression of the torque Tb of the left rear wheel 15B of the vehicle body.

Figure 7:
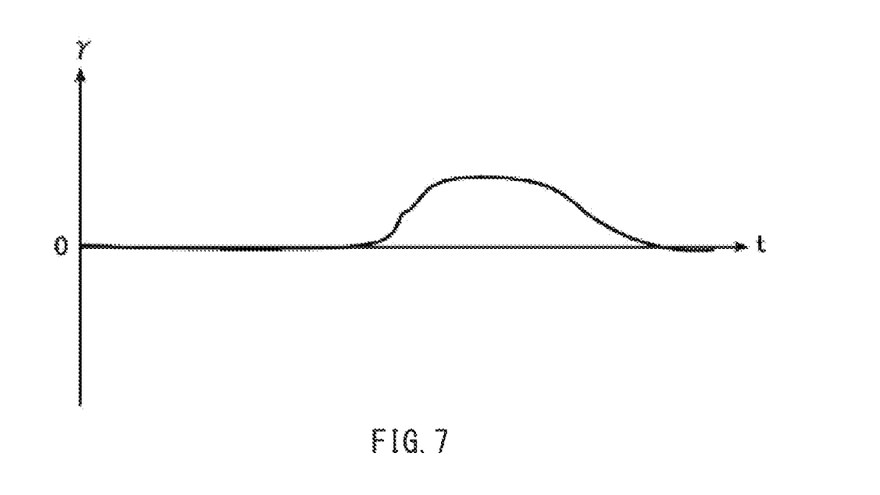
FIG. 7 is a diagram illustrating an example of a temporal change in the yaw rate of the vehicle body in a case where the torques of the right and the left rear wheels are controlled as illustrated in FIG. 5.

Accordingly, as exemplified in FIG. 7, the yaw rate γ having been generated in the vehicle body 10 may change temporally in a direction returning to zero, thus causing the vehicle body 10 to return to a state of traveling straight ahead.

At a point in time when returning to this state, i.e., at a point in time when the yaw rate γ returns to zero, canceling the suppression of the torque Tb of the left rear wheel 15B as exemplified in FIG. 5 may cause the wheel speed vb of the left rear wheel 15B to increase and return to the original high-rotation state (i.e., slipping state) as exemplified in FIG. 6.

Figure 8:
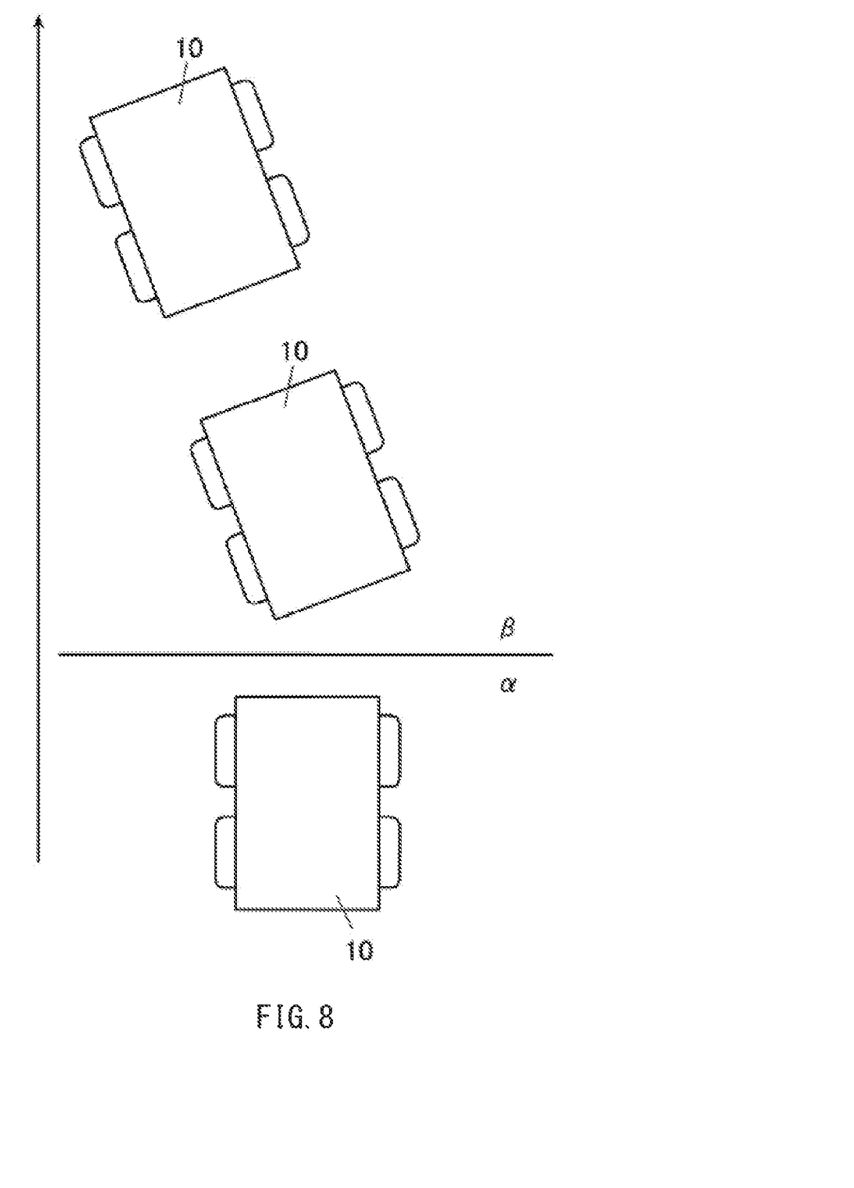
FIG. 8 is a conceptual diagram exemplifying a state in which a rear wheel side of the vehicle body swings rightward and the vehicle body thereafter returns to a state of traveling straight ahead.

Accordingly, as exemplified in FIG. 8, it is possible for the vehicle body 10 to return to the state of traveling straight ahead (i.e., a state in which the rear wheel side of the vehicle body 10 does not swing from side to side). Then, it is possible for the vehicle body 10 to return to a state of attempting to escape from the low-μ road β while rotating the right and the left rear wheels 15A and 15B at a high speed.

As described above, according to the electric vehicle 10 of the example embodiment of the technology, it is possible to return the vehicle body to a state of traveling straight ahead even when the rear wheel side of the vehicle body 10 swings rightward or leftward upon entering the low-μ road β in a state where the right and the left rear wheels 15A and 15B are slipped.

Accordingly, it is possible to suppress disturbance of the vehicle behavior upon entering the low-μ road β in a state where the wheels are slipped.

As described above, the phenomenon in which the rear wheel side of the vehicle body swings from side to side on a road such as the low-μ road can occur in some cases due to steering of the steering wheel performed by the driver.

However, in a case where the generation of the yaw rate γ of the vehicle body as steered by the steering wheel causes the rear wheel side of the vehicle body to swing rightward or leftward, it may be better to generate the yaw rate γ as steered by the steering wheel. In addition, it may be better not to perform the above-described control to suppress the swinging of the rear wheel side of the vehicle body from side to side.

Accordingly, in the example embodiment of the technology, the processor 20 of the electric vehicle 10 may have, in advance, a calculation formula (which may be a table or the like) to estimate the yaw rate γ generated in the vehicle body in a case of the steering angle θ of the steering wheel. Hereinafter, the yaw rate γ calculated on the basis of the steering angle θ in this manner is referred to as a yaw rate γ0. In one embodiment, the yaw rate γ0 may serve as a "second yaw rate".

The processor 20 may calculate a difference between the yaw rate γ measured by the yaw rate sensor 22 and the yaw rate γ0 calculated on the basis of the steering angle θ of the steering wheel measured by the steering angle sensor.

In a case where an absolute value of the calculated difference is equal to or greater than a threshold γth, the processor 20 may be configured to perform the control according to the example embodiment of the technology, i.e., the control to suppress one of the respective torques of the right and the left rear wheels 15A and 15B (see FIG. 5).

In this case, when the absolute value of the difference between the yaw rate γ measured by the yaw rate sensor 22 and the calculated yaw rate γ0 is less than the threshold γth, it is considered that the yaw rate is generated in response to steering of the steering wheel performed by the driver, and thus the above-described control may not be performed.

In addition, in a case of performing the above-described control, the processor 20 may be configured to perform a control to suppress one of the respective torques of the right and the left rear wheels 15A and 15B to allow the difference between the yaw rate γ measured by the yaw rate sensor 22 and the calculated yaw rate γ0 to be less than the threshold γth.

Such a configuration enables the behavior of the vehicle, of which the rear wheel side of the vehicle body has started to swing from side to side on a road such as the low-μ road, to be returned to a behavior corresponding to steering of the steering wheel performed by the driver.

Accordingly, the value of the yaw rate γ of the vehicle body approaches the yaw rate γ0 based on the steering of the steering wheel performed by the driver in a case where the driver steers the steering wheel from side to side, although FIG. 7 exemplifies the case where the yaw rate γ having been generated in the vehicle body 10 returns to zero.

Meanwhile, for example, as illustrated in FIG. 5, causing the wheel speed vb of the left rear wheel 15B of the vehicle body to decrease and approach the vehicle body speed V allows the gripping force of the left rear wheel 15B to be recovered and increased. This is discussed below in more detail.

Here, a slip ratio s of a rear wheel (wheel) is defined as follows.

$$\text{Slip ratio } s = (\text{wheel speed } v - \text{vehicle body speed } V)/\text{vehicle body speed } V \times 100\% \quad (1)$$

In one embodiment, the slip ratio s may serve as a "slip ratio".

That is, the slip ratio s may be calculated on the basis of the wheel speed v (i.e., va and vb) of the right and the left rear wheels 15A and 15B measured by the wheel speed sensor 24 (see FIG. 1) and the vehicle body speed V calculated from the data on the position of the vehicle body received by the GPS receiver 23.

When the wheel speed v and the vehicle body speed V are equal to each other, the slip ratio s is 0%. In addition, in a case where the wheels are slipped and the wheel speed v is much greater than the vehicle body speed V, the slip ratio s can exceed 100% in some cases.

Figure 9:
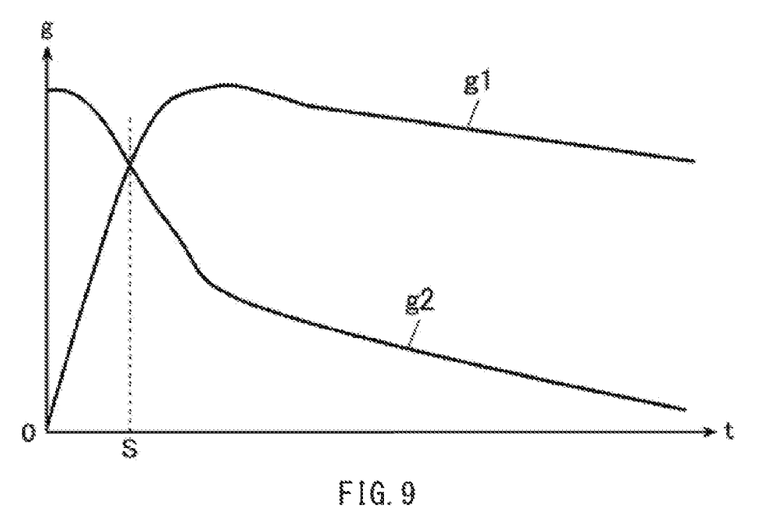
FIG. 9 is a diagram exemplifying a relationship between a slip ratio and gripping forces (vertical grip and lateral grip) of the wheel.

There may be a relationship between the slip ratio s and a gripping force g of the wheel, as exemplified in FIG. 9.

Note that g1 in the drawing denotes a gripping force acting, on a wheel, in the traveling direction of the vehicle, and is hereinafter referred to as a vertical grip g1. In addition, g2 in the drawing denotes a gripping force acting, on the wheel, in a lateral direction of the vehicle, and is hereinafter referred to as a lateral grip g2.

As appreciated from FIG. 9, the vertical grip g1 may be zero in a case where the slip ratio s is 0%, and may increase as the slip ratio s increases.

When the slip ratio s exceeds a certain value, the vertical grip g1 may reach a substantially constant state (or a state of gradually decreasing as the slip ratio s increases).

In contrast, the lateral grip g2 may be the largest in a case where the slip ratio s is 0%, and may decrease as the slip ratio s increases. When the slip ratio s exceeds a certain value, the lateral grip g2 may gradually decrease as the slip ratio s increases, and may reach a value close to zero.

Accordingly, in a state where the rear wheels 15A and 15B are slipped (slip ratio s>>0) as described above, the lateral grip g2 may be very small, and may be in a state where the rear wheel side of the vehicle body swings from side to side.

For example, in a case where the slip ratio s is a value equal to or close to a slip ratio S corresponding to an intersection of the vertical grip g1 and the lateral grip g2 on a graph of FIG. 9, both of the vertical grip g1 and the lateral grip g2 are relatively large.

In this case, the lateral grip g2 may be relatively large, and thus swinging of the rear wheel side of the vehicle body from side to side may be suppressed. In addition, the vertical grip g1 may also be relatively large, and thus the state of the vehicle body traveling straight ahead may be maintained.

Accordingly, in some embodiments, the processor 20 may be configured to control the slip ratio s calculated in accordance with the above expression (1) to be a value in the vicinity of the slip ratio S when performing the control to suppress any of the respective torques Ta and Tb of the right and the left rear wheels 15A and 15B as described above. The above-described slip ratio S, i.e., the slip ratio s at which not only the vertical grip g1 but also the lateral grip g2 is increased, can be changed depending on a material and a width of a tire constituting the wheel as well as on a shape of a groove or the like on a surface of the tire.

However, it is appreciated, through the study of the present inventor, that the above-described slip ratio S is about 10% in any of the cases and that, i.e., the slip ratio s of 10% allows the vertical grip g1 and the lateral grip g2 of the wheel to have favorably large values.

Accordingly, in some embodiments, upon performing the control as described above, the processor 20 may be configured to perform a control to suppress one of respective torques of the right and the left rear wheels to allow the slip ratio s calculated in accordance with the above expression (1) to be 10%.

To summarize the above, for example, the control in the processor 20 of the electric vehicle 10 according to the example embodiment of the technology may be configured as follows.

Figure 10:
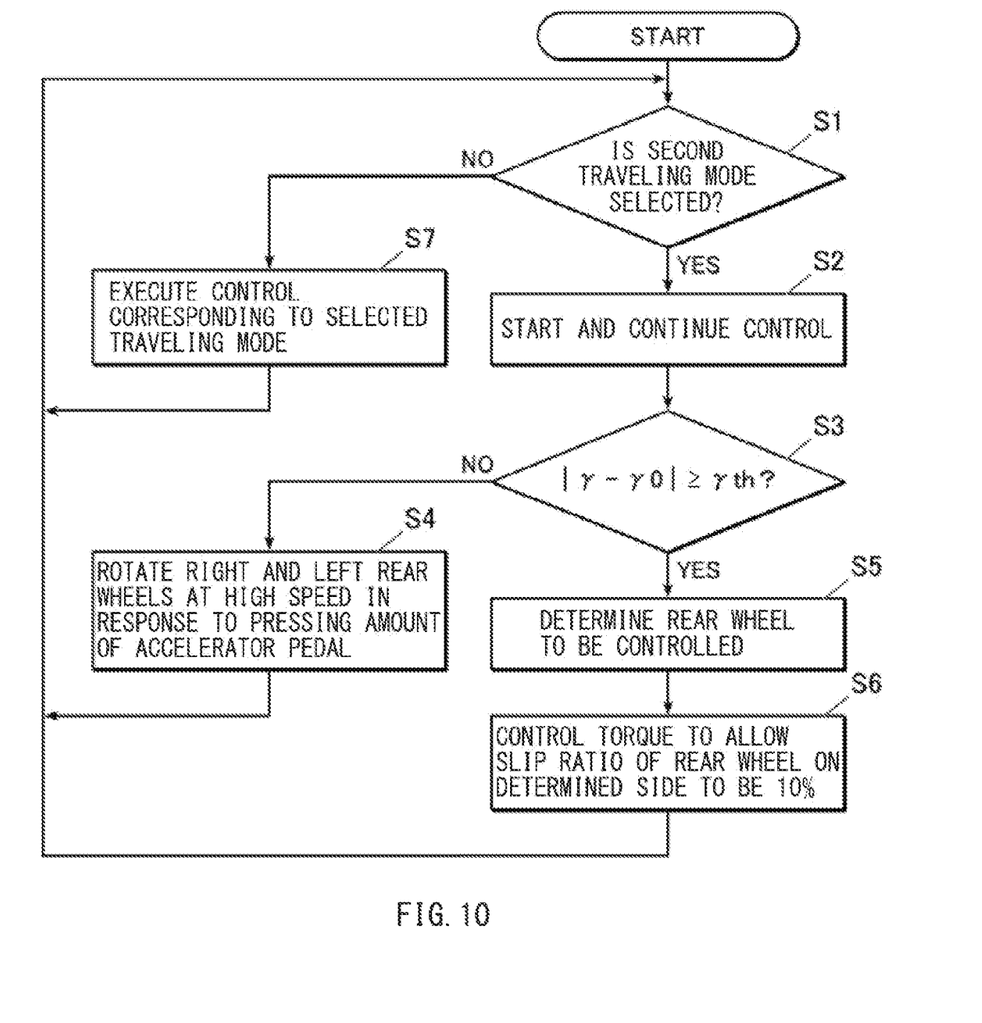
FIG. 10 is a flowchart illustrating an example of a configuration of controls in a processor of the electric vehicle according to one example embodiment of the technology.

Description is given below with reference to a flowchart exemplified in FIG. 10.

Note that, even when any traveling mode is selected as the traveling mode of the vehicle, the processor 20 may constantly perform processing to calculate the yaw rate $\gamma 0$ generated in the vehicle body on the basis of the steering angle $\theta$ of the steering wheel transmitted from the steering angle sensor 21.

The processor 20 may be configured to control the torque T of corresponding one of the wheels 15 as necessary to allow the yaw rate $\gamma$ of the vehicle body to be the yaw rate $\gamma 0$ corresponding to the steering angle $\theta$ of the steering wheel, by comparing the calculated yaw rate $\gamma 0$ with the yaw rate $\gamma$ of the vehicle body transmitted from the yaw rate sensor 22.

The processor 20 may be configured to constantly acquire necessary data from various sensors or the like. Such a configuration of the acquisition may include collecting data on the wheel speed v of corresponding one of the wheels 15 from the wheel speed sensor 24 of corresponding one of the wheels 15, and obtaining data or the like on the position of the vehicle body from the GPS receiver 23.

In addition, the processor 20 may be configured to perform a necessary control in accordance with the acquired data.

When the driver selects the above-described second traveling mode, i.e., the traveling mode that allows the right and the left rear wheels 15A and 15B to slip in order to escape from a condition such as deep snow (step S1; YES), the processor 20 may start the control according to the example embodiment of the technology (step S2).

That is, the processor 20 may first change the respective torques Ta and Tb of the right and the left rear wheels 15A and 15B in response to the pressing amount of the accelerator pedal pressed by the driver to rotate the right and the left rear wheels 15A and 15B at a high speed. Accordingly, the right and the left rear wheels 15A and 15B may be in the state of being slipped.

Subsequently, the processor 20 may estimate the yaw rate $\gamma 0$ generated in the vehicle body on the basis of the steering angle $\theta$ of the steering wheel transmitted from the steering angle sensor 21, as described above.

The processor 20 may then determine whether a difference between the yaw rate $\gamma$ measured by the yaw rate sensor 22 and the calculated yaw rate $\gamma 0$ is equal to or greater than the threshold $\gamma$th, i.e., whether the absolute value of the difference between the yaw rate $\gamma$ and the yaw rate $\gamma 0$ is equal to or greater than the threshold $\gamma$th (step S3).

When the difference between the measured yaw rate $\gamma$ and the calculated yaw rate $\gamma 0$ is less than the threshold $\gamma$th (step S3; NO), the processor 20 may continue to perform the current control. That is, the processor 20 may continue to perform the control to rotate the right and the left rear wheels 15A and 15B at a high speed in response to the pressing amount of the accelerator pedal (step S4).

Meanwhile, in a case where the difference between the measured yaw rate $\gamma$ and the calculated yaw rate $\gamma 0$ is equal to or greater than the threshold $\gamma$th (step S3; YES), the processor 20 may determine whether to perform the control to suppress any of the respective torques Ta and Tb of the right and the left rear wheels 15A and 15B (step S5).

That is, the processor 20 may determine to perform a control to suppress the torque Ta of the right rear wheel 15A in a case where the rear wheel side of the vehicle body swings leftward, and to perform a control to suppress the torque Tb of the left rear wheel 15B in a case where the rear wheel side of the vehicle body swings rightward.

Subsequently, the processor 20 may suppress the torque T of the rear wheel 15 on the determined side to allow the slip ratio s of the rear wheel 15 on the determined side to be 10% (step S6).

The processor 20 may then continue the above-described control, as long as the difference between the yaw rate $\gamma$ and the yaw rate $\gamma 0$ is equal to or greater than the threshold $\gamma$th (step S3; YES). Note that the yaw rate $\gamma$ may be measured by the yaw rate sensor 22, and the yaw rate $\gamma 0$ may be calculated on the basis of the steering angle $\theta$ of the steering wheel measured by the steering angle sensor 21.

When the difference between the yaw rate $\gamma$ measured by the yaw rate sensor 22 and the calculated yaw rate $\gamma 0$ is less than the threshold $\gamma$th (step S3; NO), the processor 20 may stop the control to suppress any of the respective torques Ta and Tb of the right and the left rear wheels 15A and 15B.

The processor 20 may then return the way of controlling to the control to change the respective torques Ta and Tb of the right and the left rear wheels 15A and 15B in response to the pressing amount of the accelerator pedal pressed by the driver to rotate the right and the left rear wheels 15A and 15B at a high speed. Accordingly, the right and the left rear wheels 15A and 15B may return to the state of being slipped.

The processor 20 may continue to perform the above-described control during a period when the driver selects the second traveling mode (step S1: Yes).

In a case where the driver selects a traveling mode other than the second traveling mode (step S1; NO), the processor 20 may end the control in the second traveling mode, and may change the way of controlling to a control corresponding to the selected traveling mode to execute the control (step S7).

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 1

The invention claimed is:

1. An electric vehicle comprising:
a yaw rate sensor configured to measure a yaw rate of a vehicle body of the electric vehicle;
a steering angle sensor configured to measure a steering angle of a steering wheel of the electric vehicle;
a processor configured to control respective torques of right and left rear wheels coupled to respective motors of the electric vehicle, configured to execute instructions to:
determine whether a mode that allows the right and the left rear wheels to slip to escape from a first condition is selected as a traveling mode of the electric vehicle,
in response to the traveling mode being selected, calculate a difference between a first yaw rate and a second yaw rate, the first yaw rate being a yaw rate measured by the yaw rate sensor, the second yaw rate being calculated on a basis of the steering angle measured by the steering angle sensor,
in response to the difference between the first yaw rate and the second yaw rate being equal to or greater than a threshold, suppress one of the respective torques of the right and the left rear wheels on a basis of the first yaw rate to suppress a swing caused by the electric vehicle switching from the first condition to a second condition, the second condition having a road surface with a low friction coefficient.

2. The electric vehicle according to claim 1, further comprising:
a receiver configured to receive data on a position of the vehicle body; and
a wheel speed sensor configured to measure at least respective wheel speeds of the right and the left rear wheels, wherein
the processor is configured to perform a control to suppress one of the respective torques of the right and the left rear wheels to allow a slip ratio to be 10%, the slip ratio being calculated on a basis of the respective wheel speeds of the right and the left rear wheels and on a basis of a vehicle body speed calculated using the data on the position of the vehicle body received by the receiver.

* * * * *